(12) United States Patent
Jensen

(10) Patent No.: US 7,648,324 B1
(45) Date of Patent: Jan. 19, 2010

(54) LOADING PLATFORM SYSTEM WITH SLIDE UNIT

(75) Inventor: Jens Herman Jensen, Ulfborg (DK)

(73) Assignee: Sürensen Hydraulik, Zweigniederlassung, Ulfborg, Filialaf Sörensen Hydraulik GmbH, Ulfborg (DK)

( * ) Notice: Subject to any disclaimer, the term of this patent is extended or adjusted under 35 U.S.C. 154(b) by 1952 days.

(21) Appl. No.: 09/590,905

(22) Filed: Jun. 9, 2000

(30) Foreign Application Priority Data

Jun. 8, 2000 (EP) .................................. 00112328

(51) Int. Cl.
*B60P 1/44* (2006.01)

(52) U.S. Cl. ....................................... 414/549; 414/556
(58) Field of Classification Search ......... 414/556–558, 414/549, 541, 542
See application file for complete search history.

(56) References Cited

U.S. PATENT DOCUMENTS

| | | | | |
|---|---|---|---|---|
| 2,348,993 A | * | 5/1944 | Novotney | 414/557 |
| 3,032,214 A | * | 5/1962 | Brannan | 414/557 |
| 4,078,676 A | * | 3/1978 | Mortenson | 414/558 |
| 4,579,503 A | * | 4/1986 | Disque | 414/558 |
| 5,253,973 A | * | 10/1993 | Fretwell | 414/549 X |
| 5,556,250 A | * | 9/1996 | Fretwell et al. | 414/558 |
| 6,019,567 A | * | 2/2000 | Lutkus et al. | 414/549 |

FOREIGN PATENT DOCUMENTS

| | | | |
|---|---|---|---|
| EP | 786374 | * | 7/1997 |
| GB | 2107671 | * | 5/1983 |
| GB | 2207113 | * | 1/1989 |
| JP | 10109585 | * | 4/1998 |

\* cited by examiner

*Primary Examiner*—James Keenan
(74) *Attorney, Agent, or Firm*—Klaus J. Bach

(57) ABSTRACT

In a loading platform system for mounting on vehicles, particularly trucks, comprising at least one lift support arrangement consisting of two essentially parallel spaced support structures, an essentially plate-like loading platform for lifting and lowering a load, at least one lift actuator for lifting and lowering the loading platform and a slide unit, which is movable back and forth in the longitudinal direction of the vehicle and on which at least the lift support arrangement, the loading platform and the lift actuator are mounted. The slide unit is adapted to be mounted on the support frame of the vehicle by transverse frame members, which are fitted to the spacing of the vehicle support frame members and include means at their ends for mounting them to the vehicle support frame members.

20 Claims, 10 Drawing Sheets

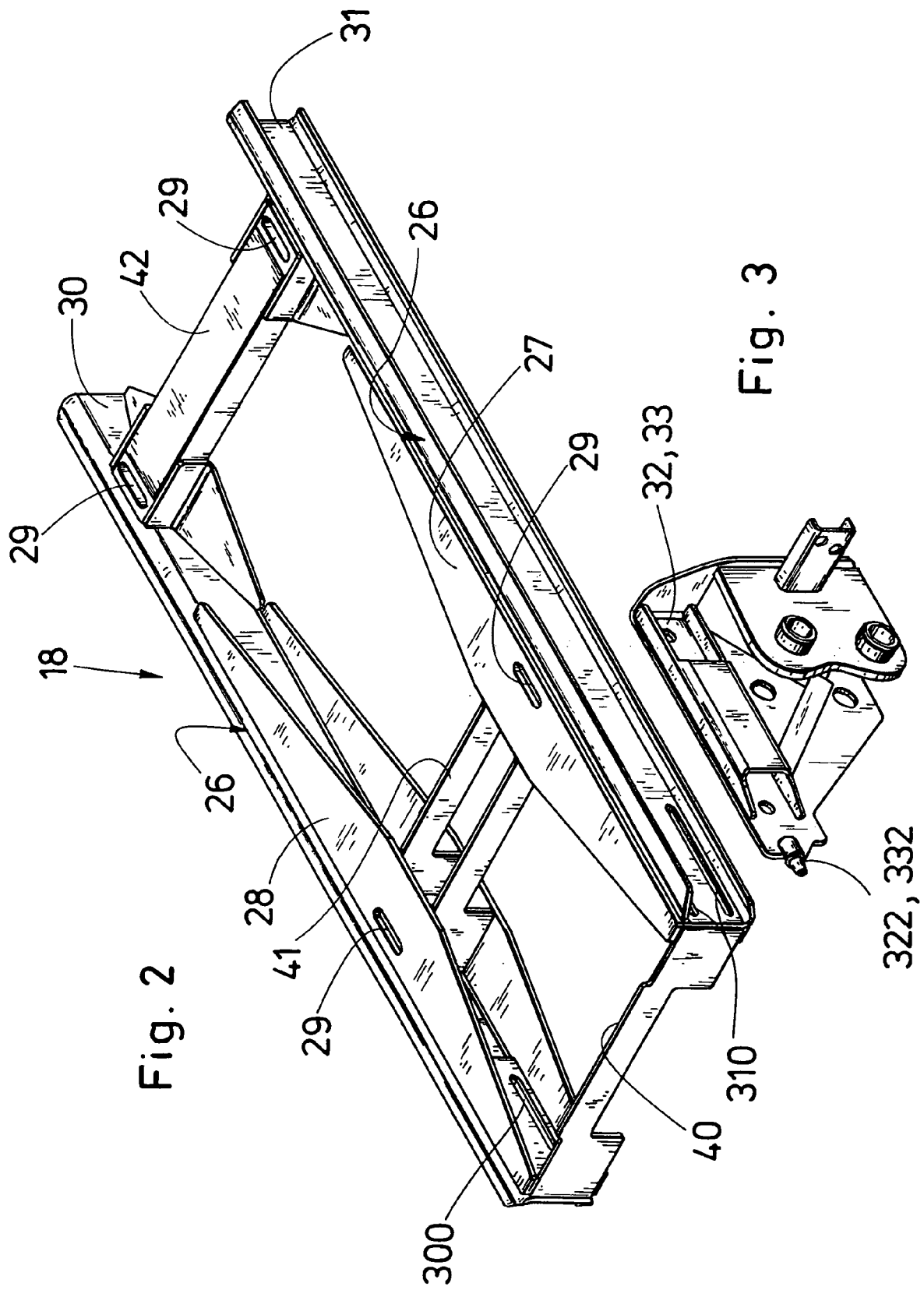

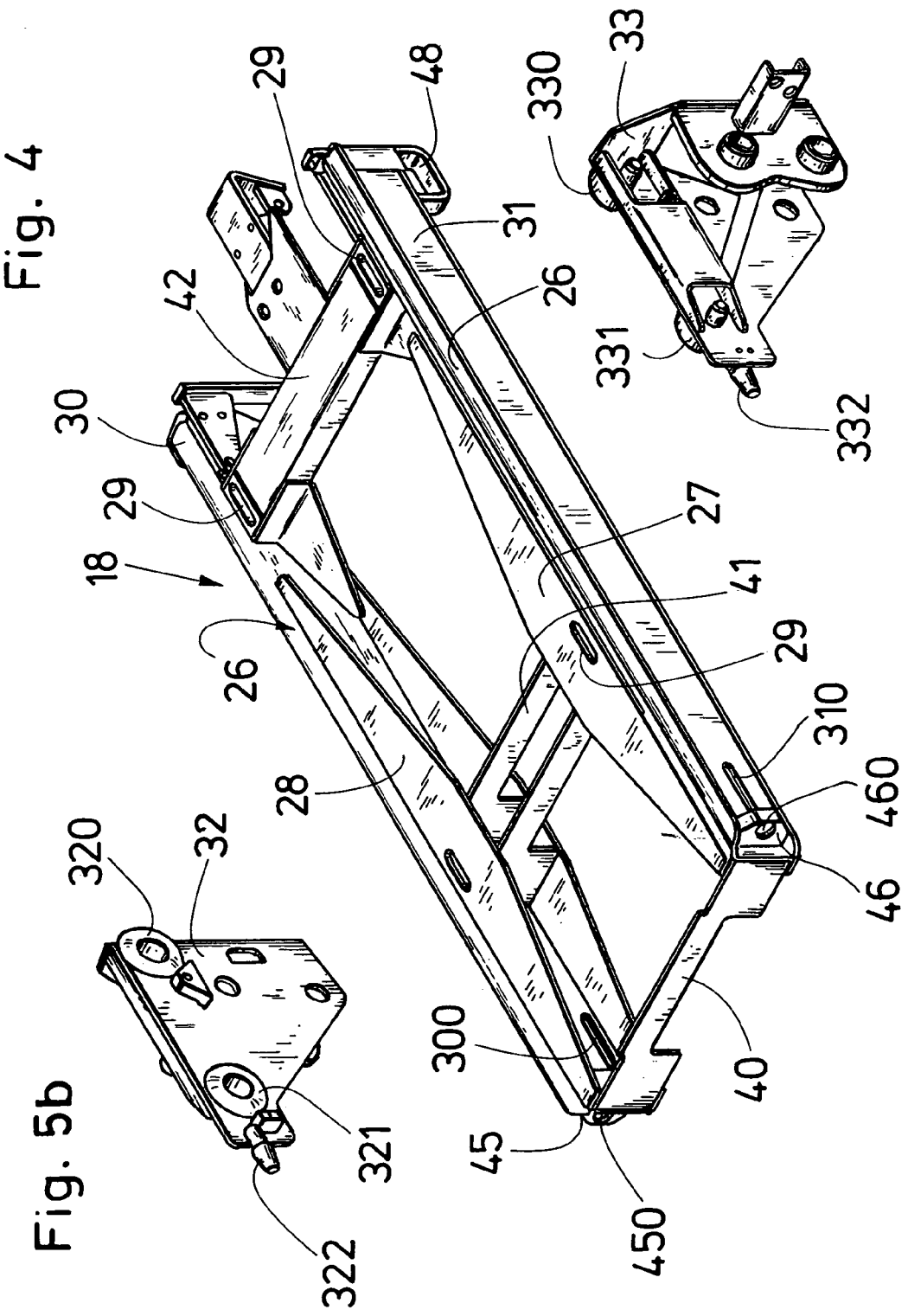

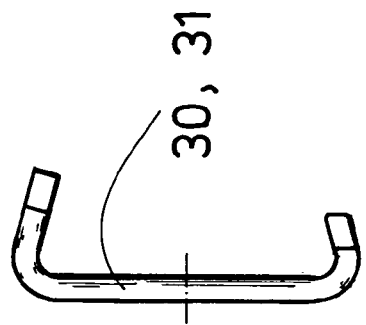
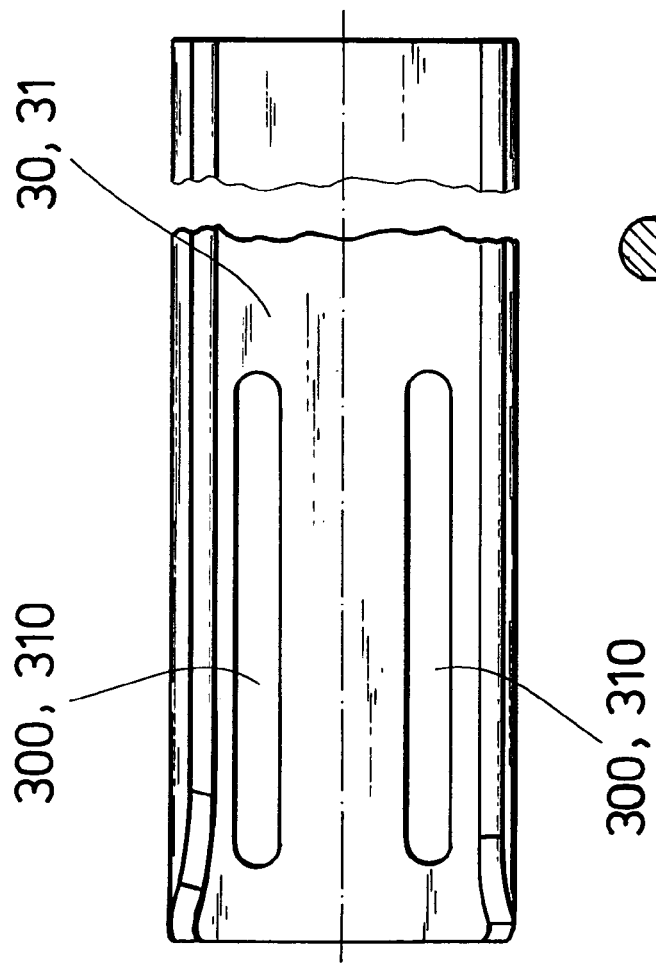
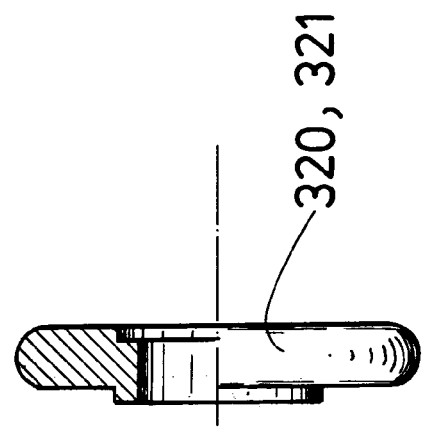

LOADING PLATFORM SYSTEM WITH SLIDE UNIT

BACKGROUND OF THE INVENTION

The invention resides in a loading platform system for mounting on vehicles, particularly on trucks, comprising at least one lifting arrangement including two essentially parallel spaced support structures, an essentially plate-like loading platform for lifting and lowering a load and a slide unit adapted to be mounted to the vehicle so as to be slidable back and forth in the longitudinal direction of the vehicle and supporting at least the lifting arrangement, the loading platform and a lifting and lowering actuating device.

Loading platform systems of this type are known in various forms and are used in connection with trucks to facilitate the unloading of loads from the truck bed at the point of destination onto the surface on which the truck is disposed so that the load can then otherwise be moved to its final destination. The same applies to the loading procedure of a truck that is the load is placed onto the loading platform which is disposed on the road surface, whereupon the loading platform is raised to the level of the truck bed and the load is then moved from the loading platform onto the trucks load bed.

In some loading platform systems, the loading platform can be pivoted from a horizontal to a vertical position to form an end gate for closing the load bed of the truck. The loading platform system then includes a tilt actuation structure by which the loading platform is tilted before and after the loading or unloading procedure.

In other loading platform systems only a single lift actuation devices and also only one load lifting and lowering arrangement are provided. Additionally, a tilting mechanism may be provided, which, however, is capable of tilting the platform only by a few degrees so as to tilt the free end of the loading platform down into close proximity with the road surface so that loads can be moved from and onto the loading platform without having to move them over a threshold. In this case, the loading platform can generally be folded in its center about an axis extending transverse to the longitudinal vehicle axis, whereby its length in the longitudinal direction of the vehicle can be reduced to about one half. This is true whether the loading platform does or does not include a tilting actuation device and a tilting arrangement. In this way, that is, in a folded state, the loading platform can be moved under the vehicle's loading bed so that it does not project from the rear of the vehicle during operation of the vehicle. Such loading systems which are also called folding loading platform systems are in use in various forms.

These loading platform systems are generally custom-installed on trucks or they are installed on the frame of a vehicle together with the vehicle body if the vehicle is delivered without body. On one hand, the manufacturers of loading platform systems are generally not the manufacturers of the vehicle bodies and usually not the manufacturers of the trucks. It is furthermore known that the chassis of different motor vehicles of different manufacturers are usually quite distinct so that the systems need to be adapted to the various models in order to make the mounting of the system to the vehicle possible. Depending on the type of vehicle such loading platform systems are mounted directly under the structure forming vehicle loading bed. Occasionally, they are mounted on the axles or other components.

The various mounting locations for the loading platform system all require different adaptative structures which are relatively expensive, particularly if the loading platform systems are mounted directly below the vehicle loading bed.

Also, the present loading platform systems offer little protection from forces acting on the vehicle equipped with the loading platform system for example from forces caused by being rear-ended by another vehicle. During a rear-ending accident conventional loading platform systems are generally totally destroyed and often cause themselves extensive damage to the vehicle on which the loading platform system is mounted.

It is therefore the object of the present invention to provide a loading platform system of the type as initially described which however can be mounted on a vehicle in a simple manner without the need for expensive mounting structures adapted to the various vehicle types and the various locations where the loading platform is to be mounted. It should be easily possible to mount such a loading platform system on vehicles after manufacture, that is when the vehicle has already been in use, without the need for expensive conversion and adaptation measures and it should also be relatively inexpensive to manufacture the system, and installation of the system should be easy and fast.

SUMMARY OF THE INVENTION

A loading platform system for mounting on vehicles, particularly trucks, comprises at least one support arrangement consisting of two essentially parallel spaced support structures, an essentially plate-like loading platform for lifting and lowering a load, at least one lift actuator for lifting and lowering the loading platform and a slide unit, which when mounted on the vehicle is movable back and forth in the longitudinal direction of the vehicle and on which the at least the lift support arrangement, the loading platform and at least the lift actuator are mounted. The slide unit is adapted to be mounted on the support frame of the vehicle.

The advantage of the solution according to the invention resides essentially in that the support frame permits a force locking mounting of the loading platform system. Furthermore, the chassis of vehicles generally consists of a support frame with which the type of loading platform system with which the present invention is concerned can be used, that is, of support elements which extend in longitudinal direction over the full length of the vehicle and on which also the axles of the vehicle and the drive elements are mounted. The support frame is therefore a very suitable mounting place for the slide unit. In addition, with the solution according to the invention, all forces effective on the loading platform system can be applied directly to the support frame of the vehicle. In this way, a very secure connection between the slide unit that is, respectively, the loading platform system in its entirety and the support frame of the vehicle is obtained. Although, the support frames of such vehicles of different manufacturers are not standardized, an adaptation of a respective connection of the slide unit with the support frame of vehicles even of different manufacturers is possible without essential design changes since, in principle, the support frame designs of such vehicles are the same as mentioned earlier. As a result, the slide unit can be easily adapted and mounted to the vehicle in accordance with the object of the invention.

In a preferred embodiment of the invention, the slide unit is mounted to the support frame by means of at least one transverse verse member, which bridges the distance between two frame members essentially forming the support frame. This extremely simple but very effective mounting of the slide unit permits the respective adaptation to the spaced support members forming in this case the support frame of the vehicle in such a way that the transverse member only needs to adapted in length to the distance between the two frame members. No other adaptation steps are required.

In accordance with another advantageous embodiment of the invention, the transverse member is provided, at its opposite ends, with front elements which are connected to the transverse member and by way of which the transverse member is connected to the frame members forming the vehicle frame. In order to avoid the need for welding connections on the support frame of the vehicle, which may detrimentally affect the strength of the support frame, the front elements have a plurality of holes for the reception of bolts by way of which the slide unit or respectively, the transverse member of the slide unit can be removably connected to the vehicle support frame.

In another advantageous embodiment of the loading platform system of the invention, the slide unit can be removably mounted by way of paw-shaped clamping elements, which extend over horizontal webs of the frame members forming the vehicle support frame. Such an advantageous mounting arrangement is reasonable if the spaced frame members, which form the support frame have, for example, a U-shaped cross-section or if they are double T profile frame members. The paw-like clamping elements then extend over the webs of the frame member with such a cross-section, which webs are essentially parallel to the plane of the road surface.

It is particularly advantageous if the transverse member is extendable for example in a telescopic fashion so that its length can be adjusted to differently spaced frame members of the vehicle support frame without any other manufacturing measures.

It is advantageous if the transverse member is attached to the slide unit in such a way that it can move with respect to the vehicle frame in the longitudinal direction of the vehicle if subjected to a force exceeding a predetermined value. In this way, within certain limits, the energy of another vehicle crashing into the loading platform system attached to a vehicle can be partially absorbed and the energy not absorbed can be conducted into the support frame of the vehicle. Such an energy absorption can be advantageously achieved in that the slide unit includes, at its side adjacent the traverse member, at least two opposite spaced legs provided with elongated holes for the mounting of the transverse member. The elongated holes have two functions, that is, they permit movement of the slide unit relative to the transverse member when subjected to a force in excess of a predetermined threshold force which is adjustable by a corresponding adjustment of the engagement of a mounting nut on a mounting bolt, which extends through the transverse member and through the elongated holes and they also permit a compensation for dimensional tolerances between the frame members forming the support frame.

The slide unit itself is preferably so contructed that it includes at least two spaced parallel guide elements, which form support members that are stationary with respect to the vehicle and at least two spaced parallel slide members, which form support members that are longitudinally movable with respect to the vehicle and which are slideably supported in the guide elements. The guide elements preferably form an essential part of the support structure of the slide unit that is the guide elements are at the same time support elements of the slide unit.

The guide elements may basically have any suitable form providing for sliding support of the slide elements and for accommodating the vertical forces or force components acting on the slide elements when the loading board platform is in operation for example when the loading platform is raised or lowered. Preferably, the guide element has a C-shaped cross-section so that a correspondingly shaped slide element can be preferably slideably supported in the so formed partially sidewardly open guide channel of the guide element.

In order to facilitate the back and forth movement of the slide unit or, respectively, the slide elements, that is, in order to reduce the friction as much as possible, the slide elements are supported in the guide elements by roller elements which are connected to the slide elements that is the roller elements roll in a sidewardly open guide channel delimited in vertical direction at opposite sides by the guide elements of C-shaped cross-section.

In another advantageous embodiment of the loading platform, the slide unit includes stops which are effective in the outward movement direction of the slide elements and which limit the outward movement of the slide unit in the longitudinal direction of the vehicle. In this way, it is ensured that the slide unit will not move beyond the stops that is it cannot be moved or pulled out of the vehicle.

However, preferably the stops have additional functions that is to take up and transmit the force which is effective on the loading platform when the slide unit is in its outward end position particularly during normal use of the loading platform that is during loading and unloading. Then the forces transmitted from the loading platform, by way of the operating mechanism, to the slide elements are transferred additionally, by way of the stops, into the stationary part of the slide unit and from there to the chassis of the vehicle on which the loading platform system is mounted. For this purpose, the stops preferably include holes extending in the longitudinal direction of the vehicle in which support pins are received when the slide elements are in their extended end positions.

In order to improve the fit of the support pins in the holes when the slide elements are finally moved out or, respectively, to optimize the fit, the holes and the support pins are conical in longitudinal direction whereby also tolerances of the guide elements and also of the slide elements sliding or rolling therein can be accommodated, that is, the conical support pins are guided when entering the holes until they are firmly engaged therein.

In order to compensate also for tolerances of the slide unit in the longitudinal direction of the vehicle, or respectively, the guide elements and the slide elements which are back and forth movably disposed therein, the stops are supported adjustably in the longitudinal direction of the vehicle. For this purpose, the guide elements include for example elongated holes through which for example bolts extend into corresponding threaded bores in the stops. In this way also construction conditions which are unique to the chassis of the vehicle on which the loading platform system is to be mounted can also be taken into account.

It is also advantageous that the slide unit includes end stops which are effective in the insertion direction of the slide element and which limit the inward movement of the slide unit. Basically, also these end stops can be adjustable relative to the slide unit or respectively, relative to the guide elements in order to provide for an adjustability relative to the front stops as explained earlier.

In certain countries, it is legally required that the motor vehicle includes energy-absorbing end zones. These zones are provided for absorbing kinetic energy of a vehicle rear-ending the motor vehicle. Such a legal requirement applies also to parts and added equipment such as the loading platform system according to the invention which is mounted to the vehicle in the manner according to the invention. In order to fulfill this safety requirement which is often legally posted the loading platform system is preferably so designed that the end stops are non-elastically deformable if forces exceeding a predetermined energy amount are effective thereon in the longitudinal direction of the vehicle. With this relatively simple measure an energy absorption capability satisfying the legal requirements or even better energy absorption capabilities can be achieved.

There are loading platform systems of the type with which the present invention is concerned with which the slide unit can be normally moved under the vehicle or moved out of the rest position under the vehicle. Although it has continuously been tried to reduce the weight of these units while maintaining their rigidty in order to reduce the weight of the vehicles equipped with such systems the minimum weight of such systems in still so high that substantial manual forces are required for moving the system. It is therefore advantageous if the slide unit is moveable by a power slide actuator formed by a pneumatic and/or hydraulically operated piston-cylinder arrangement. However, basically it is also possible to provide an electrically operated slide actuator. For its operation, the vehicle power supply can be employed which is always present. For slide units with pneumatically and/or hydraulically operated piston/cylinder arrangements, the pneumatic and/or hydraulic system of the vehicle which is generally present, especially in trucks, can be utilized. However, also a pneumatic and/or hydraulic system can be used which is provided for the lifting and lowering actuators of the loading platform system and, if applicable, also the tilt movement of the loading platform and which is provided separately from the pneumatic and/or hydraulic system of the vehicle.

In order to achieve a highly parallel operation of the support structures during the lifting and, if applicable, the tilting movement of the loading platform, which is particularly important if only a single lift actuator which operates only one support structure is provided, the two support structures are rigidity interconnected by a transverse beam, which is arranged at the end of the support structures remote from the slide unit.

The transverse beam is preferably in the form of a bumper element. In this way, in addition to ensure parallel movement of the two support structures, it forms an element, which is, within limits, taking up the energy of a vehicle hitting the loading board system and transfers that energy to the vehicle frame by way of the support structures, the slide unit and the transverse frame member.

In principle, the transverse beam may have any suitable cross-sectional shape. However, in order to avoid torsion of the transverse beam as much as possible that is especially to provide for parallel movement of the two support structures during lifting and lowering of the loading platform, the transverse beam has an essentially rectangular cross-section and preferably is provided at both ends with a flange web by way of which it is mounted to one of the support structures. With this embodiment, the individual support structures can easily be replaced since they are separate components if they are damaged or destroyed, and this also applies to the transverse beam.

The invention will be described below in detail with reference to the enclosed drawings on the basis of a particular embodiment.

BRIEF DESCRIPTION OF THE DRAWINGS

FIG. 2 is a perspective view of the slide unit and of the loading platform system without any details, FIG. 3 is a perspective view of a slide element which is back and forth movably supported in guide elements of the slide unit wherein a support structure and a lift actuator or a tilt actuator (not shown) is connected to the slide element, FIG. 4 is a perspective view of a slide unit of the loading platform system with any details omitted showing however the front and end stops for the slide elements, FIG. 5a is a perspective view of a slide element which is back and forth movable in guide elements of the slide unit but which is provided with rollers which are supported in the guide elements so as to be movable therein, FIG. 5b shows a second slide element which is mirror-reversed with respect to the slide element shown in FIG. 5a, FIG. 6 is a perspective view of the loading platform system without the loading platform wherein the slide elements are in an intermediate position between the front and the end stops, FIG. 11 is a side view of the guide element, FIG. 12 is a frontal view of the guide element according to FIG. 11, FIG. 13 is a side view of a roller element which is guided in the guide elements so that it can roll therein.

DESCRIPTION OF PREFERRED EMBODIMENTS

Figure 1:
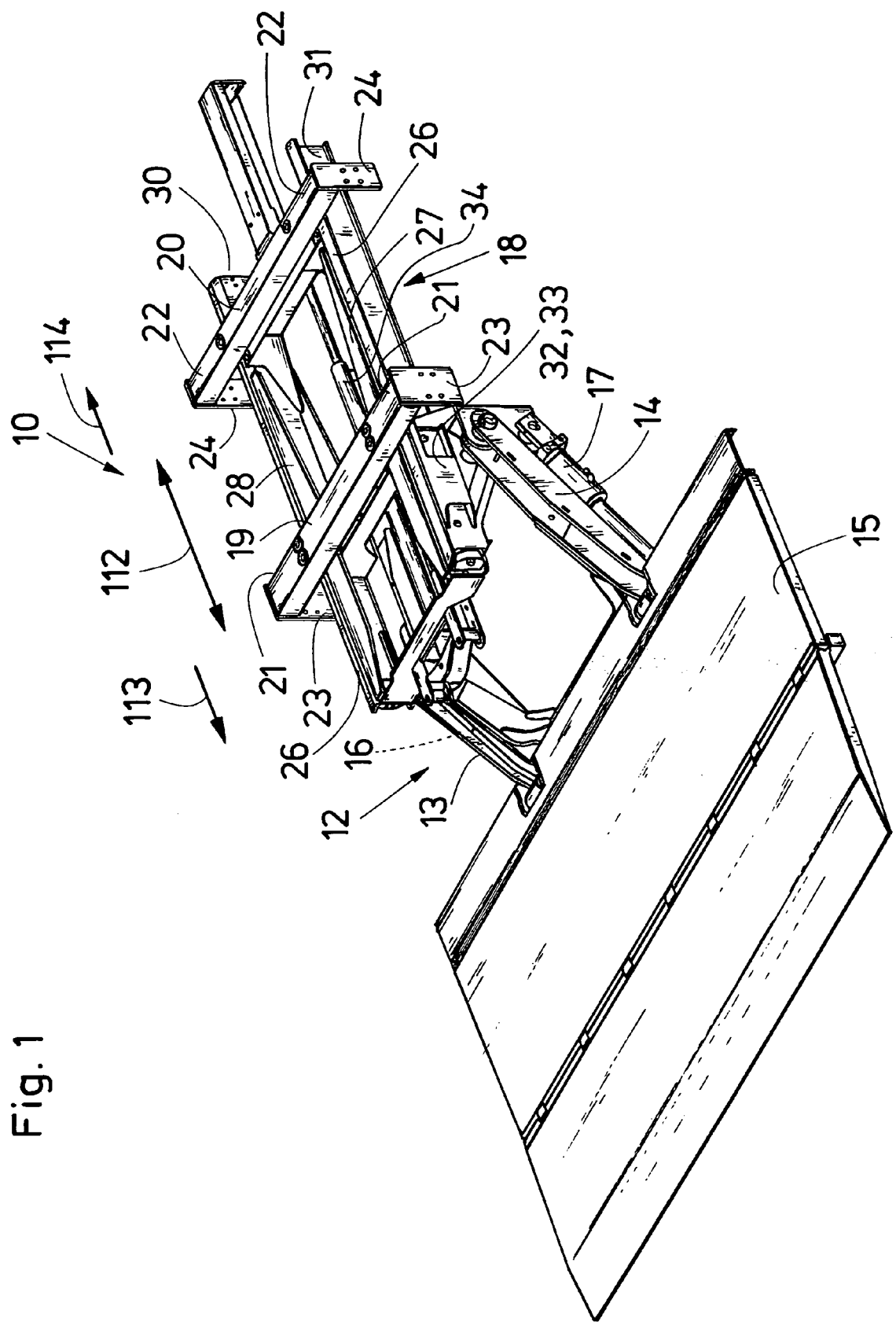
FIG. 1 is a perspective representation of the complete loading platform system without the support frame of the vehicle on which the loading platform system is mounted.

First, reference is made to FIG. 1 in which the loading platform system 10 for mounting on a vehicle 11, especially a truck, is shown in its entirety. For clarity reasons, the vehicle 11 is not shown in detail in the figure. It is shown in the figure schematically by indicating the respective lines of the support frame 100, 111 of the vehicle 11.

Figure 14:
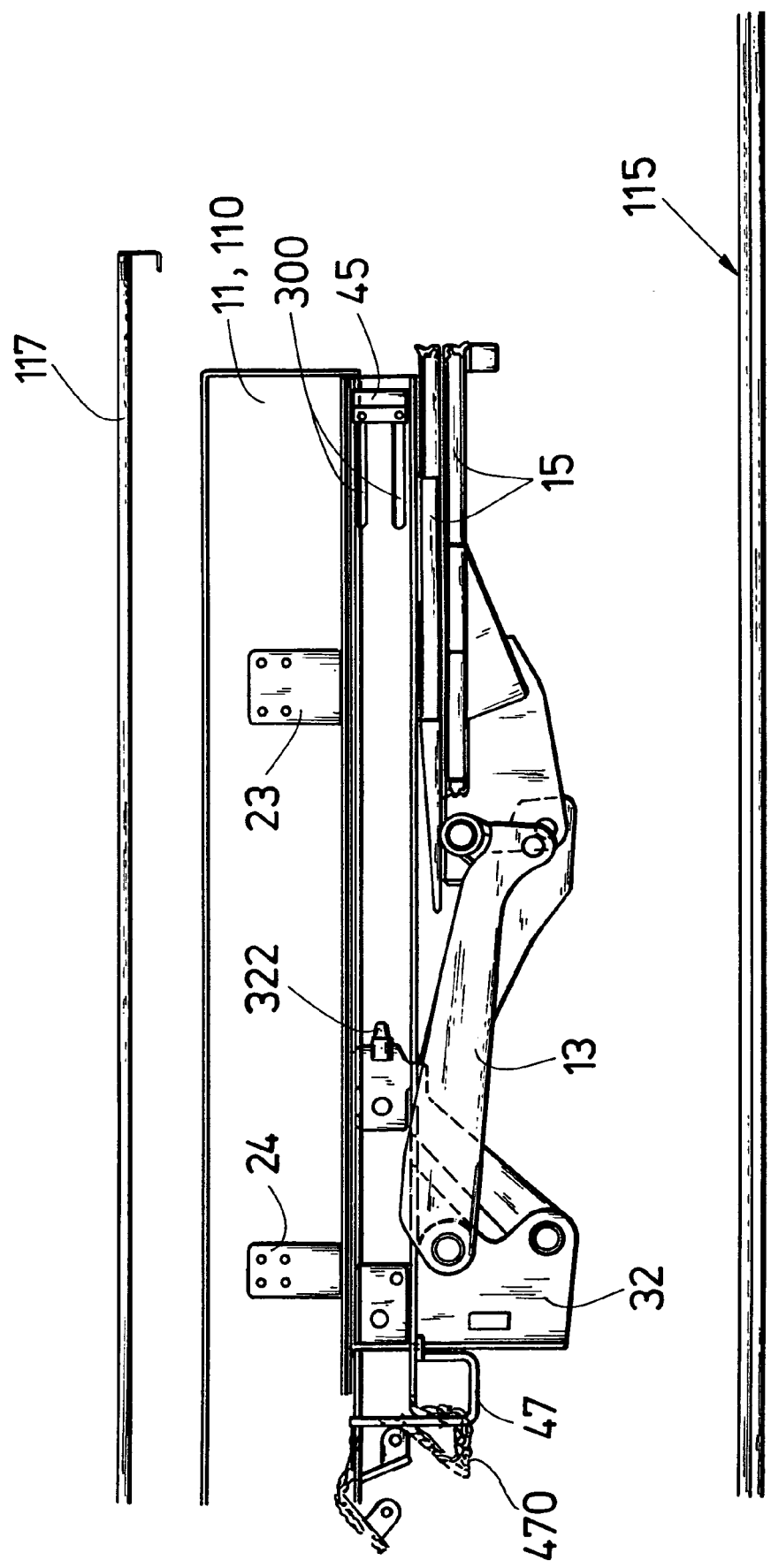
FIG. 14 is in a side view of the rear end of a vehicle chassis on which the loading platform system is mounted showing schematically an inelastic deformation of the end stop for the slide element.

The loading platform system 10 comprises at least one support arrangement consisting of two spaced essentially parallel support structures 13, 14. It furthermore comprises an essentially plate-like loading platform 15 for lifting and lowering a load, the loading platform 15 shown herein being a so-called fold away loading platform which can be folded together to half its length in the longitudinal direction of the vehicle, see arrow 112. In addition, a lift actuator structure 16 for the lifting and lowering of the loading platform 15 is provided. There may also be provided a tilt actuator structure 17 for tilting the loading platform for example from a horizontal to a vertical position. This may be provided for certain embodiments of the loading platform system 10 or for the purpose of slightly tilting the tip of the loading platform 15 when it is lowered onto the street surface 115 (FIG. 14). If the tip of the loading platforms is disposed on the load surface 115, there is no threshold. This facilitates the movement of loads onto the loading platform 15 or the removal therefrom. Finally, the loading platform system comprises a slide unit 18, which is back and forth movable in the longitudinal direction 112 of the vehicle, see again arrow 112, on which slide unit 18 at least the support arrangement 12, the loading platform 15 and the lift actuator mechanism 16 and, if present, also the tilt actuator mechanism 17 are mounted.

In the embodiment of the loading platform system 10 as shown in the figures the slide unit 18 is supported by two transverse members 19, 20, which extend essentially at a right angle with respect to the longitudinal direction of the guide elements 30, 31. The slide unit 18 is mounted to the transverse members 19, 20 by way of the legs 27, 28 and the elongated holes 29 (FIG. 2) formed therein by means of a bolt-nut connection which is not shown. At the ends 21, 22 of the transverse members 19, 20, there are end elements 23, 24. The end elements 23, 24 have a predetermined number of holes by way of which the transverse members 19, 20 and, consequently, the slide unit 18 is mounted between the two frame members 110, 111 (FIG. 9) of a vehicle for example by means of bolt and nut connections, which provide for easy mounting of the loading platform system 10 to a vehicle 11, see FIGS. 6, 8 and 9.

Figure 6:
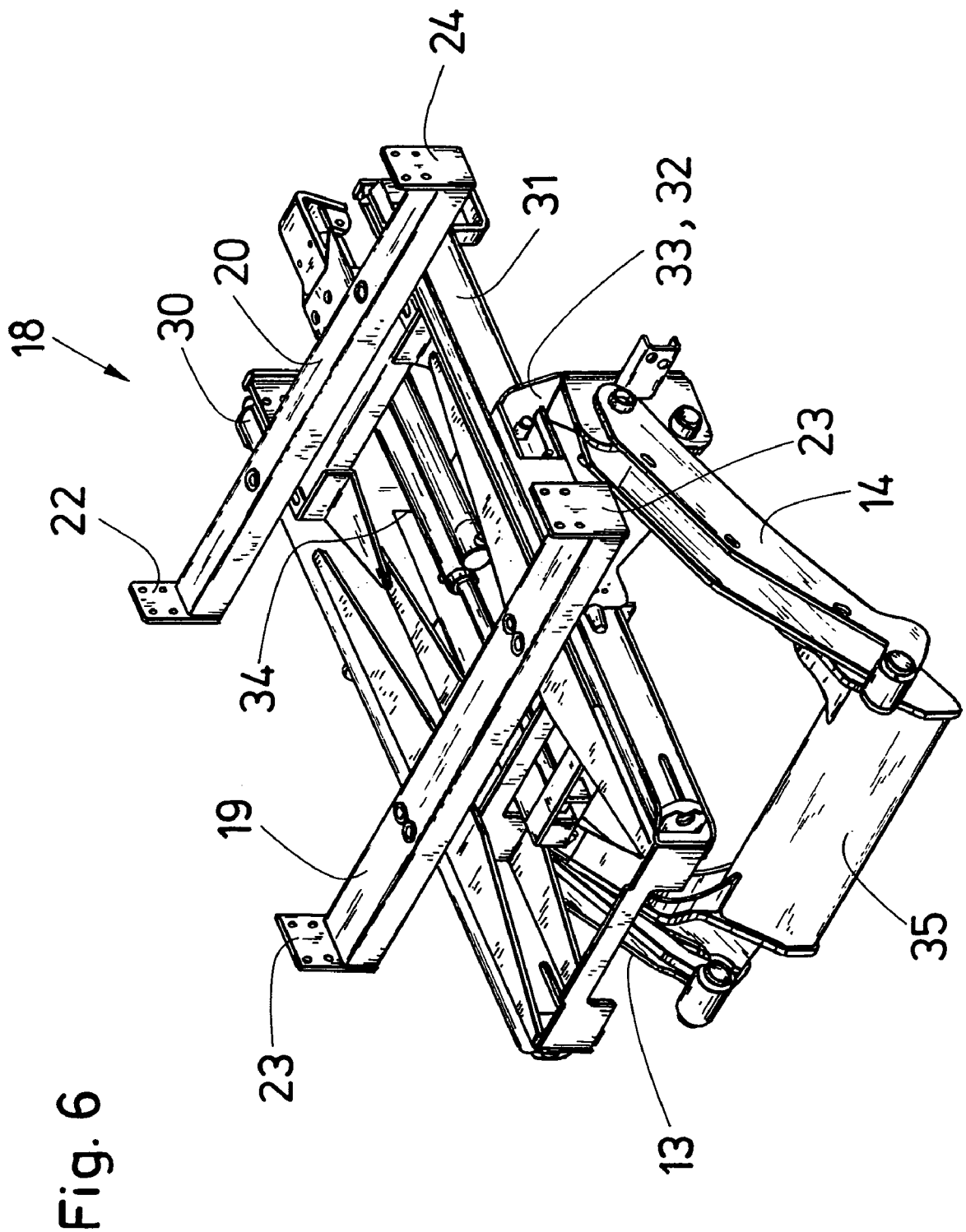
Figure 8:
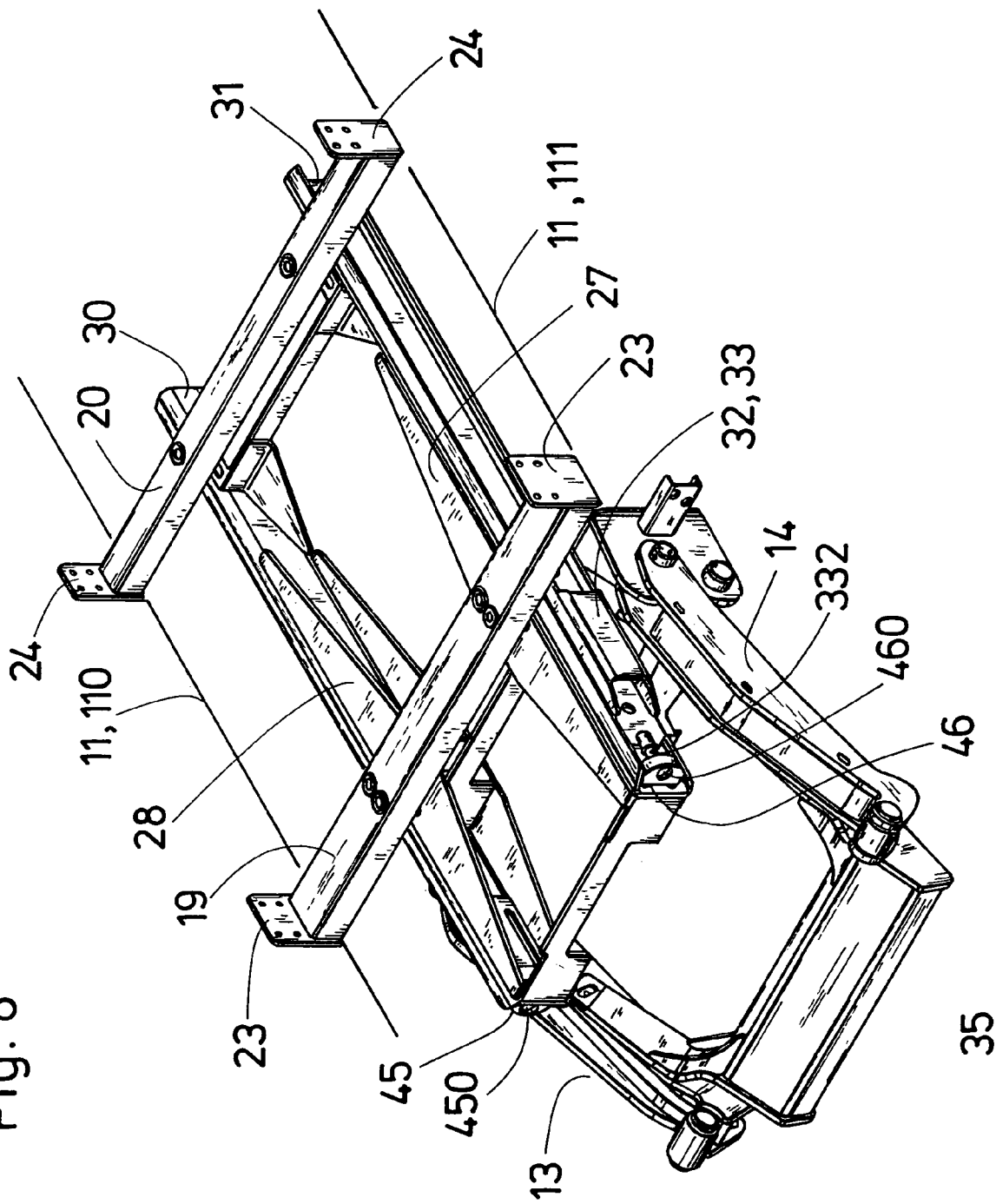
FIG. 8 shows the loading platform system according to FIG. 1 in a perspective representation however without the loading platform and the slide actuator but showing the transverse beam at the end of the support structures.
Figure 9:
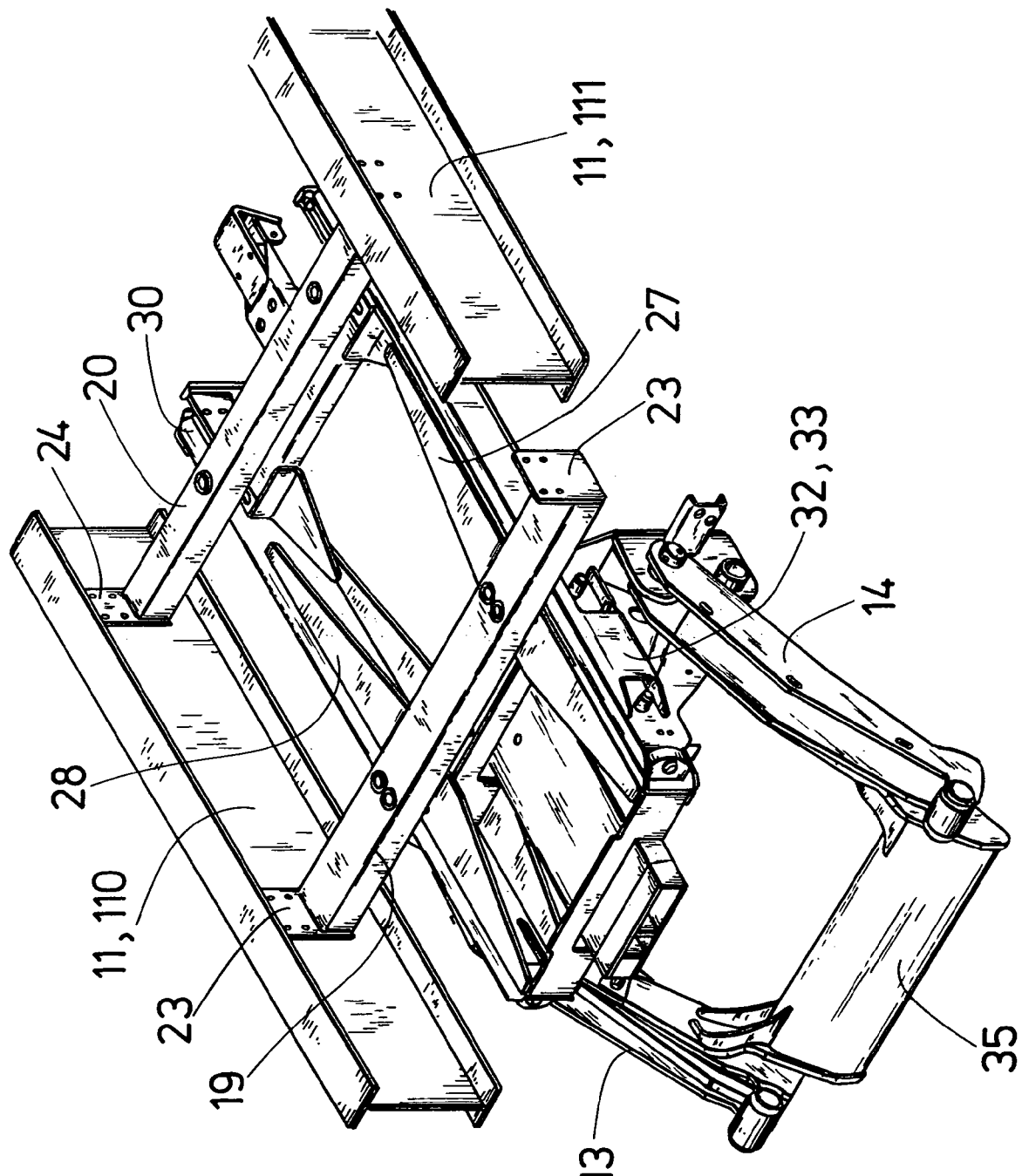
FIG. 9 shows the loading platform system according to FIGS. 1 and 8 in a perspective representation, wherein the system is mounted on two spaced essentially parallel double-T frame members forming the chassis of a vehicle.
Figure 10:
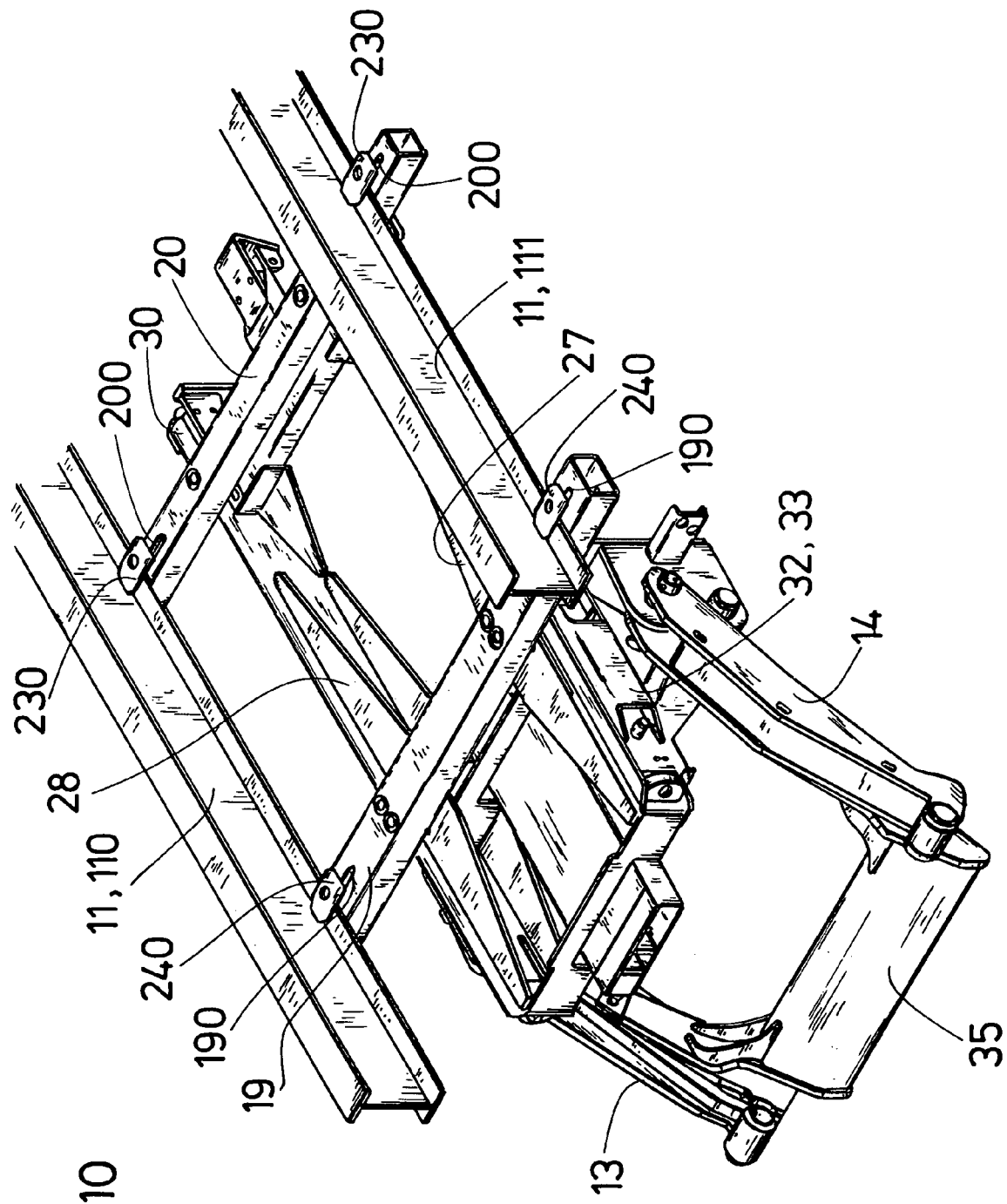
FIG. 10 shows the loading platform system according to FIGS. 1 and 9 in a perspective representation wherein the system is mounted to the chassis of the vehicle by means of straps which extend from the lower essentially horizontal webs of the double-T frame members.

FIG. 10 shows a mounting arrangement which is modified from the mounting arrangement of the loading platform system 10 or respectively, the slide unit 18 on the vehicle 11 as shown in FIGS. 6, 8, and 9. In place of the end elements 23, 24, clamping elements 230, 240 are provided which can be connected to the respective transverse member 19, 20 by bolts extending through elongated holes formed in the transverse members 19, 20. The clamping elements 230, 240 extend for example over the horizontal webs of a support frame 110, 111 of a vehicle which support frame consists of double T frame members. The clamping elements 230, 240 may be provided at both opposite lower web sides of the double T frame members of the vehicle frame, which cannot be directly seen in FIG. 10 because of the perspective representation.

As shown in FIG. 2, FIG. 3, slide elements 32, 33 are received and guided in the guide elements 30, 31 so as to be longitudinally movable in the guide elements 30, 31, which are, at the same time, support frame members.

The guide elements 30, 31, see FIGS. 11 and 12, have an essentially C-shaped cross-section and may consist of suitably bent and dimensioned steel profile strips. The slide elements 32, 33 may be slidably supported in the guide elements 30, 31 and be suitably guided therein by their legs. However, the slide elements 32, 33 may also be supported and guided in the guide elements 30, 31 by roller elements 320, 321, 330, 331, such a roller being shown in greater detail in FIG. 13, see also FIGS. 5a and 5b.

To each of the slide elements 32, 33, a support structure 13 or, respectively, 14, is connected and also a lift actuator, and, respectively, a tilt actuator so that the support structures 13, 14 together with the corresponding joints of the loading platform 15, see FIG. 1, each forms an essentially parallelogram-like support arrangement 12 or tilt support arrangement. With the slide elements 32, 33, the whole support arrangement 12 or tilt support arrangement together with the loading platform 15 is longitudinally slideable in the guide elements 30, 31 that is it can be moved under the vehicle 11 or respectively, pulled out from an end position below the vehicle 11 to an operating position. This is achieved for example by means of a slide actuator 34, see FIG. 1, which, as shown, is a simple slide actuator 34 but which may also be a double slide actuator which provides for aa axial extension or shortening at both sides. The slide actuator 34 may be operated electrically and/or pneumatically and/or hydraulically.

The guide elements 30, 31 are provided with stops 45, 46 (FIG. 4) which limit the extension movement of the slide elements 32, 33 and, accordingly of the whole slide unit 18 in the slide-out direction 113 - see FIG. 1. The stops 45, 46, which essentially extend into the slide path of the slide elements 32, 33 in the guide elements 30, 31 include holes 450, 460 oriented in the longitudinal direction 112 of the vehicle. The slide elements 32 on the other hand are provided with support pins 322, 332 (FIGS. 5a, 5b) having an axis extending essentially on the longitudinal vehicle direction 112. With maximum outward movement in the outward direction 113, the support pins 322, 332 extend into the respective holes 450, 460 and the support pins 322, 332 are conical in the direction of their axes that is in their longitudinal cross-sections so that a force- and form- locking connection between the support pins 322, 332 and the holes 450, 460 is established when the slide unit 18 is in its outward end position in the outward direction 113. Then the forces effective on the loading platform 15 during normal operation of the loading platform system 10 are transferred, by way of the support structures 13, 14 and the slide elements 32, 33, directly to the support frame members 110, 111 forming the chassis of the vehicle 11. The slide unit, that is, essentially the guide elements 30, 31 is, or are, essentially not exposed to the torques, to which they would be subjected if the stops 45, 46 and the support pins would not be provided.

The stops 45, 46 are adjustable in the longitudinal direction of the vehicle by means of the elongated holes 300, 310 in the guide elements 30, 31, see particularly FIG. 11. By way of bolt connections, which are not shown in the drawings but which extend through the elongated holes 300, 310, the stops 45, 46 can be so positioned that, on one hand, tolerances can be accommodated and, on the other hand, a predetermined maximum outward movement in the outward direction 113 of the slide unit 18 can be adjusted and set in a simple manner.

Figure 7:
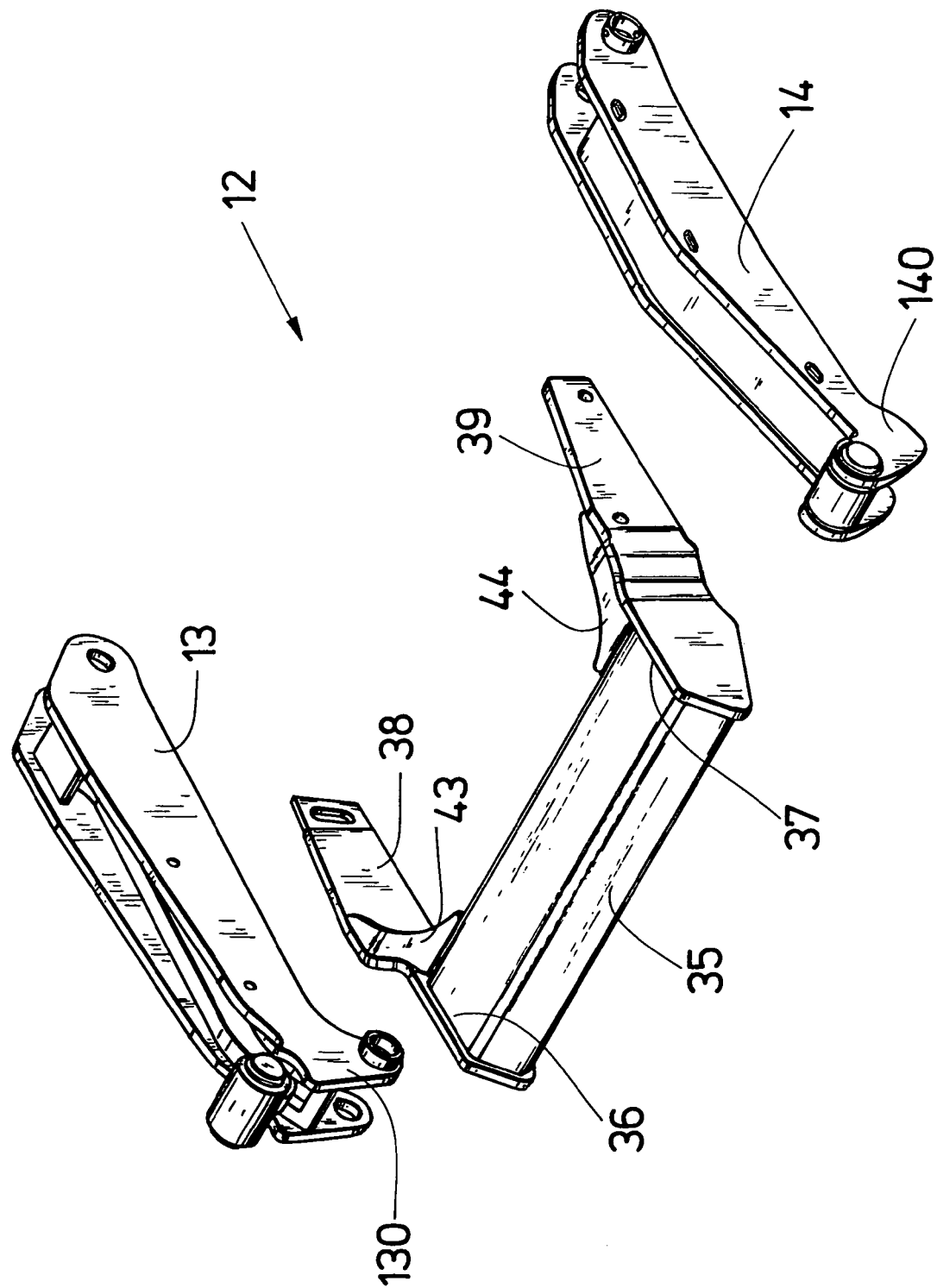
FIG. 7 is a perspective view of the two support structures showing, in an exploded fashion, the loading platform system with the lift mechanism and, if applicable, also the tilt mechanism and a transverse beam interconnecting the two support structures.

The two support structures 13, 14, see FIG. 7, are interconnectable by means of a transverse beam 35. For this purpose, the transverse beam 35 is provided at its opposite ends 36, 37 with flange webs 38, 39. With these flange webs 38, 39, which are connected to the transverse beam 35 by way of reinforcement members 43, 44, for example by welds, the transverse beam 35 is connected to the two support structures 13, for example by bolt and nut connections. The transverse beam 35 provides for a rigid interconnection between the two support structures 13, 14, whereby an accurate parallel movement of the two support structures 13, 14 is achieved. It also provides a good protection against rear-ending as the transverse beam is so designed that it extends beyond the ends 130, 140 of the support structures 13, 14 remote from the slide unit 18, see FIG. 6.

There are provided furthermore end stops 47, 48 (FIGS. 4, 14), which limit the inward movement of the slide unit in inward direction of movement 114, see FIG. 1. The end stops 47, 48 are again engaged by the slide elements 32, 33, see FIG. 14. The end stops 47, 48 can be formed by an integral tubular element and extend over the two guide elements 30, 31.

The end stops 47, 48 however, may also be formed each as a different element 47, 38 as it is apparent from FIG. 4. The end stops 47, 48 are mounted on the guide elements 30, 31 in a suitable way, for example, by bolt-nut-connections or by welding or similar.

The end stops 47, 48 have not only the function of limiting the inward movement of the slide unit 18, that is, to limit the movement of the slide unit below the vehicle, they rather also have the function of an energy absorbing device when for example another vehicle back-ends the vehicle 11 provided with the loading platform system 10. To that end, the end stops 47, 48 are so designed that they are non-elastically deformable if the kinetic energy of the back-ending vehicle is above a predetermined threshold value. Consequently, the end stops 47, 48 form a collapsing structure as it is generally used in the design of motor vehicles.

In an inactive state of the loading platform system 10, the loading platform 15 is retracted in a folded way to an end position below the vehicle 11. That is the slide elements 32, 33, on which the support structures 13, 14 and the loading platform are mounted, are disposed in the right end position as shown in FIG. 1 that is in the inward direction of movement 114 in engagement with the end stops 47, 48, see FIG. 14. By means of the slide actuator 34, which is operable in both directions along the longitudinal vehicle axis, the guide elements 30, 31 are moved out from their end position below the vehicle until the support pins 322, 332 of the slide elements 32, 33 are received in the holes 450, 460 of the outer stops 45, 46, see FIG. 1.

The two support structures 13, 14 and, together therewith, the loading platform 15 are then suitably lowered onto the road surface 115 and the loading platform is then unfolded to an open position, see FIG. 1. In the extended position in the move-out direction 113, see FIG. 1, the loading platform system 10 is then ready for operation and can be operated as desired.

The invention claimed is:

1. A loading platform system for mounting on vehicles having a support frame, comprising: a lift support arrangement (12) including two essentially parallel spaced support structures (13, 14), a loading platform (15) supported by said parallel spaced support structures (13, 14) for lifting and lowering a load, at least one lift actuating device (16, 17) for lifting and lowering the loading platform (15) as well as a slide unit (18) with a slide guide structure (30, 31) and slide elements (32, 33), which are back and forth movable in the longitudinal direction (112) of the vehicle along the slide guide structure (30, 31) and to which at least the lift support arrangement, the loading platform (15) and the at least one lift actuating device (16, 17) are attached, said slide unit being mountable on the support frame of the vehicle by way of transverse members (19, 20) which bridge the distance between two spaced frame members (110, 111) of the vehicle support frame and, at their longitudinal ends, are firmly connected to said vehicle support frame members (110, 111), the slide guide structure (30, 31) including stops (45, 46) provided with openings (450, 460) extending into the path of movement of the slide elements (32, 33) and the slide elements (32, 33) having support pins (322, 332) extending into the openings (450, 460) when the slide elements (32, 33) are moved into interlocking engagement with the stops (45, 46) for locking the slide elements (32, 33) to the slide guide structure (30, 31).

2. A loading platform system according to claim 1, wherein said transverse members (19, 20) are provided at their opposite ends (21, 22) with front elements (23, 24) which are connected to the transverse members (19, 20) and by way of which the transverse members (19, 20) are mounted on said support frame members (110, 111).

3. A loading platform system according to claim 1, wherein said slide unit (18) is removably connected to the spaced frame members (110, 111) by way of clamping elements (230, 240), which extend over horizontal webs of said frame members (110, 111) forming the vehicle support frame.

4. A loading platform system according to claim 1, wherein said slide unit (18) is mounted to the transverse members (19, 20) such that said slide unit (18) is movable essentially in the longitudinal direction with respect to said support frame members (110, 111) of the vehicle when a force is effective on said slide unit (18) which exceeds a predetermined amount.

5. A loading platform system according to claim 4, wherein said slide unit (18) includes, at the side (26) thereof directed toward the transverse members (19, 20), at least two opposite spaced legs (27, 28) in which elongated holes (29) for mounting the slide unit (18) to the transverse member (19, 20) are formed.

6. A loading platform system according to claim 1, wherein said slide unit (18) comprises at least two essentially parallel spaced guide elements (26) which are stationary relative to the vehicle frame and the slide elements (32, 33) which are supported by said guide elements (16, 17) movably longitudinally back and forth relative to the vehicle frame.

7. A loading platform system according to claim 6, wherein said guide elements (26) have an essentially C-shaped cross-section.

8. A loading platform system according to claim 6, wherein said slide elements are slideably supported in the guide elements (30, 31).

9. A loading platform system according to claim 6, wherein said slide elements (32, 33) are guided in the guide elements (30, 31) by roller elements (320, 321, 330, 331) mounted on the slide elements (32, 33).

10. A loading platform system according to claim 1, wherein said openings (450, 460) and the support pins (322, 332) are conical in their longitudinal cross-section.

11. A loading platform system according to claim 1, wherein said stops (45, 46) are adjustable in the longitudinal direction (112) of the vehicle.

12. A loading platform system according to claim 1, wherein said slide unit (18) includes end stops (47, 48) which are effective in the longitudinal direction (112) of the vehicle at least in the direction of slide-in movement (114) of the slide elements (32, 33) and which limit the slide-in movement of said slide unit (18).

13. A loading platform system according to claim 12, wherein said end stops (47, 48) are so designed that they are non-elastically deformed when subjected by the slide elements (32, 33) to a force above a predetermined threshold in the longitudinal vehicle direction (112).

14. A loading platform system according to claim 1, wherein a slide actuator (34) is provided for moving said slide elements 32, 33) back and forth.

15. A loading platform system according to claim 14, wherein said slide actuator (34) consists of a pneumatically or hydraulically operated piston cylinder system.

16. A loading platform system according to claim 1, wherein a transverse beam (35) is provided by which the spaced support structures (13, 14) are interconnected.

17. A loading platform system according to claim 16, wherein said transverse beam (35) is arranged at the end of the support structure remote from the slide unit (18).

18. A loading platform system according to claim 17, wherein said transverse beam (35) is in the form of a protection element protecting the loading platform from damage when the vehicle is hit from the rear.

19. A loading platform system according to claim 17, wherein said transverse beam is essentially rectangular in cross-section.

20. A loading platform system according to claim 17, wherein said transverse beam (35) is provided at each end (36, 37) with a flange web (38, 39) by way of which it is mounted to one of the support structures (13, 14).

* * * * *